United States Patent [19]
Ingram

[11] Patent Number: 5,913,336
[45] Date of Patent: Jun. 22, 1999

[54] GASOLINE DISPENSING HOSE

[76] Inventor: Thomas L. Ingram, 2828 Fallon Dr., Sherman, Tex. 75090

[21] Appl. No.: 08/895,854

[22] Filed: Jul. 17, 1997

[51] Int. Cl.$^6$ .................................................... F16L 11/22
[52] U.S. Cl. .......................... 138/109; 138/112; 138/113; 138/114; 141/45; 285/123.3; 285/124.2
[58] Field of Search ..................... 138/109, 108, 138/112, 114, 113; 141/59, 44, 45; 285/123.3, 124.5, 124.2

[56] References Cited

U.S. PATENT DOCUMENTS

| 4,067,596 | 1/1978 | Kellner | 285/123.3 |
|---|---|---|---|
| 4,754,782 | 7/1988 | Grantham | 138/109 |
| 4,922,971 | 5/1990 | Grantham | 138/113 |
| 5,005,613 | 4/1991 | Stanley | 138/113 |
| 5,267,670 | 12/1993 | Foster | 138/104 |
| 5,285,744 | 2/1994 | Grantham et al. | 141/59 |
| 5,386,858 | 2/1995 | Sanders et al. | 141/59 |
| 5,398,977 | 3/1995 | Berger et al. | 141/59 |
| 5,720,325 | 2/1998 | Grantham | 138/113 |

Primary Examiner—Denise L. Ferensic
Assistant Examiner—James F. Hook
Attorney, Agent, or Firm—Jerry C. Ray

[57] ABSTRACT

An improved hose for dispensing gasoline at service stations has removable fittings at each end; the removable fittings receive spreaders, each of which in turn receive a bayonet fitting at an end of a vapor recovery tube. An internal collar on an inner portion of the removable fitting and a keeper on the bayonet fitting cooperate to hold the spreader in place. The spreader retains the bayonet fitting on the vapor recovery tube in concentric position at each end of the hose. When the gasoline hose is replaced the vapor tube is removed and the removable fittings are unscrewed; the removable fittings and the vapor tube are then installed in a new section of outer hose and the assembly is re-installed on a gasoline pump.

4 Claims, 1 Drawing Sheet ( VIEW 1-1 )

( VIEW 1-1 )

GASOLINE DISPENSING HOSE

BACKGROUND OF THE INVENTION

1. Field of the Invention

This invention relates to hoses for dispensing gasoline, and in particular to such hoses which have a vapor-recovery system and which are capable of being rebuilt for replacement.

2. Description of the Related Art

Because gasoline hoses used at service station pumps are subject to wear and tear from exposure to sunlight and to various petroleum products, being run over by cars, etc. their life is relatively short. Typically they are replaced about every two years. The hoses are expensive, especially those including an interior tube and connections used in a gasoline vapor recovery system. Presently, practice in the industry is to replace the entire hose assembly, including the outer delivery hose with its fittings, and the inner vapor-recovery tube with its fittings. The hose fittings are expensive because they are more than a simple threaded connection; each fitting includes means for accepting and holding in place an end of the vapor-recovery tube.

The vapor-recovery tube and its fittings are contained within the dispensing hose, giving them a relatively protected environment which results in a longer useful life than the outer hose. Thus the vapor tube needs replacement less frequently than the outer delivery hose. What is needed, therefore, is a means of replacing the gasoline hose without replacing the extra parts associated with vapor recovery.

SUMMARY OF THE INVENTION

The present invention is a gasoline pump hose which includes additional removable fittings at each end; these fittings have standard threads on each end, identical to the threads on fittings presently in use. Because the fittings are removable, the internal vapor recovery tube can be easily removed from the hose. Thus when the pump hose requires replacement because the outer hose material is deteriorated, the vapor recovery tube can be removed from the old hose and reinstalled in the new one, effecting a savings in cost of replacement.

Based on the above, it is an object of this invention to provide a less expensive system for replacing gasoline pump hoses.

Another object of this invention is to provide a gasoline hose which requires only partial replacement.

A further object of this invention is to provide an improved gasoline hose which allows re-use of an internal hose which is part of a vapor-recovery system.

Further objects are to achieve the above with devices that are sturdy, compact, durable, simple, safe, ecologically compatible, and reliable, yet inexpensive and easy to manufacture, install, and maintain.

The specific nature of the invention, as well as other objects, uses, and advantages thereof, will clearly appear from the following description and from the accompanying drawings, the different views of which are not necessarily scale drawings.

CATALOG OF THE ELEMENTS

Figure 1:
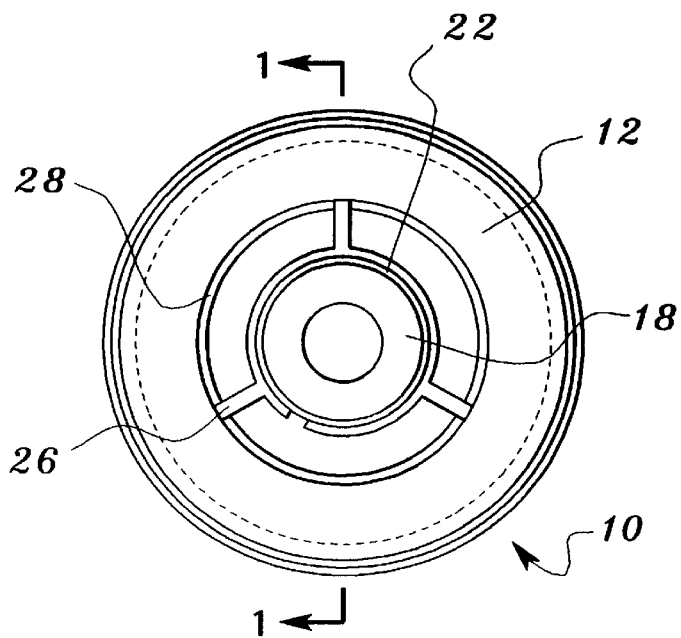
FIG. 1 is an end elevation of the hose connector.

To aid in the correlation of the elements of the invention to the exemplary drawings, the following catalog of the elements is provided:

10 hose
12 attached fitting
14 removable fitting
16 vapor recovery tube
18 bayonet fitting
20 O-ring
22 snap-ring
24 flange
26 spreader
28 collar

DESCRIPTION OF THE PREFERRED EMBODIMENTS

A hose for pumping gasoline into vehicles at service stations has male threads at both ends. One end of the hose is connected to the pump outlet; a nozzle for introducing gasoline into a vehicle's tank is connected to the other end. The purpose of the invention is to allow the replacement of the outer gasoline hose 10 while retaining and re-using the inner vapor tube and its fittings.

A typical gasoline-vapor recovery system includes a conduit which conducts vapor from near the nozzle (while it is in the neck of a fuel tank) back into the fuel storage tank. A fan provides suction in the recovery tube, so that vapor is sucked from the vicinity of the outlet nozzle back into the storage tank. The vapor recovery system described herein is of a type including a conduit or tube which is contained inside the dispensing hose.

Figure 2:
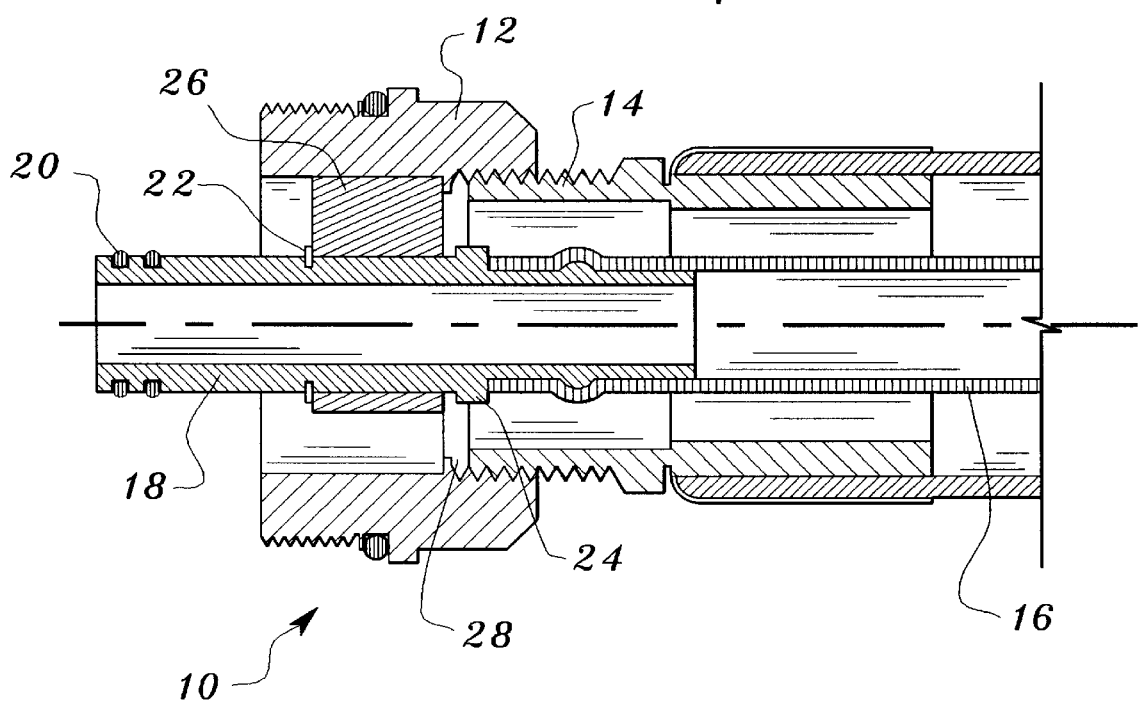
FIG. 2 is a cross section on view 1—1 of FIG. 1.

Referring now to the drawings, FIG. 1 is an end view of the invention; FIG. 2 is a cross section on view 1—1 of FIG. 1. Each end of the vapor recovery tube 16 has a male bayonet fitting 18. O-rings 20 in grooves around the bayonet fitting form a seal with the female fitting of the bayonet connector. The bayonet connector connects the internal vapor tube to the rest of the vapor recovery system. A spreader 26 holds the bayonet fitting in position relative to the fitting 14 on the gasoline hose 10. The spreader 26 holds the male bayonet connector on the vapor tube centered relative to the larger, outer fitting on the dispensing hose, so that when the hose connections are made, the bayonet fittings are aligned and mated with each other. Also the male bayonet fittings extend about ⅝" to ¾" beyond the end of the hose fittings; when a hose is installed or replaced, the bayonet connection for the vapor tube is the first connection joined.

Fitting 12 is permanently attached to the reinforced rubber hose which forms the outer wall of the gasoline hose 10. "Rubber" as used herein means any of various synthetic rubberlike substances. A second, removable fitting 14 has female threads on its inlet end and male threads on its outlet end. The female threads on removable fitting 14 are typically pipe threads for ¾" diameter pipe, and mate to the male threads on attached fitting 12. The male threads on the removable fitting 14 are thus positioned on an outer end of the hose assembly; the male threads are M34-1.5 pipe threads, a metric size which is the standard for vapor-recovery gasoline hose fittings in the U.S.

Spreader 26 has an annular central portion and two or more integral legs which extend outward from the central portion. Outer ends of the legs fit closely against an interior of the removable fitting 14 to keep the spreader centered within the fitting. Spreader 26 is contained entirely within removable fitting 14; i,e., no part of spreader 26 extends beyond fitting 14.

A collar 28 on an inner surface of removable fitting 14 forms an abutment to retain spreader 26 in place within the fitting. That is, the collar 28 limits the possible movement of the vapor tube 16; because there is a collar at each end of the hose, the vapor tube has a limited amount of linear movement.

A flange 24 on the inner end of bayonet fitting 18 restrains the spreader 26 from moving toward the inner end or tube end of the fitting. A keeper such as snap-ring 22 fits into a groove adjacent the spreader 26 to prevent the spreader from moving toward the outer end of the fitting; thus flange 24 and snap-ring 22 cooperate to hold spreader 26 in position on the bayonet fitting. When the vapor tube is installed in the gasoline hose with the spreaders and snap-washers in place, the tube is restrained from moving in either direction, except for the amount of linear free play (about ¼" to ½") allowed by the clearance between the spreaders and their respective collars.

In use, the removable fitting on 14 each end of the gasoline hose allows partial replacement of the hose as follows: first, keeper or snap-ring 22 is removed from one end of a hose to be replaced. Second, the vapor recovery tube 16 and its fittings are removed from the old hose. Third, removable fittings 14 are removed from each end of the old hose. Fourth, the removable fittings, the vapor recovery tube, and the snap-ring are installed in reverse order in a new dispensing hose. As indicated by the above description, removal of the vapor recovery tube requires only the removal of one snap-ring. This allows the end of the vapor recovery tube from which the snap-ring was removed to slide from the spreader 26 and to be removed completely from the outer hose. The spreader left in the fitting on the hose end is the removed from that end; i.e., both spreaders are extracted through the distal ends of their respective fittings.

The restrictive description and drawing of the specific examples above do not point out what an infringement of this patent would be, but are to enable one skilled in the art to make and use the invention. Various modifications can be made in the construction, material, arrangement, and operation, and still be within the scope of my invention. The limits of the invention and the bounds of the patent protection are measured by and defined in the following claims.

I claim as my invention:

1. An improved gasoline-dispensing hose of a type having an outer hose of reinforced rubber, including an inlet end, an outlet end, and a vapor-recovery tube within said outer hose, comprising:

means for replacing said outer hose while reusing said vapor-recovery tube, said means including on either end of said gasoline-dispensing hose a first threaded fitting having threads on an outer end portion thereof, and an inner end portion thereof secured to an end of said outer hose of reinforced rubber, a second threaded fitting having female threads on an inner end portion thereof for removably attaching said second threaded fitting to said first threaded fitting, said second threaded fitting having male threads on an outer end portion thereof for removably attaching said hose to a gasoline-dispensing system, and said second fitting including means for receiving a vapor-recovery tube.

2. The invention as described in claim 1, said means for receiving a vapor-recovery tube further comprising:

a collar on an interior surface of said second threaded fitting, a spreader disposed within an interior of said second threaded fitting, said spreader having at least one leg restrained by said collar, said spreader to support a bayonet fitting on an end of said vapor recovery tube, and a removable keeper on said bayonet fitting cooperating with said collar to restrain said spreader in position within said fitting.

3. The invention as described in claim 1, said means for receiving a vapor-recovery tube further comprising:

a spreader having an annular central portion and at least one integral leg extending therefrom, said spreader for receiving a bayonet fitting on an end of said vapor-recovery tube and for keeping said bayonet fitting in a concentric relationship to said second fitting, said spreader being wholly enclosed within said second fitting, and a collar on an inner surface of said second fitting to engage said leg on said spreader to keep said spreader in position within said fitting.

4. The invention as described in claim 1, said connection means further comprising:

said male threads on said outer end portion of said second fitting having dimensions to fit standard female fittings on gasoline pumps and nozzles on a gasoline-dispensing system having a vapor recovery system.

\* \* \* \* \*